(12) United States Patent
Doddaiah et al.

(10) Patent No.: US 12,197,630 B2
(45) Date of Patent: Jan. 14, 2025

(54) STORAGE ARRAY DATA DECRYPTION

(71) Applicant: EMC IP Holding Company LLC, Hopkinton, MA (US)

(72) Inventors: Ramesh Doddaiah, Westborough, MA (US); Malak Alshawabkeh, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 260 days.

(21) Appl. No.: 17/228,946

(22) Filed: Apr. 13, 2021

(65) Prior Publication Data

US 2022/0327246 A1  Oct. 13, 2022

(51) Int. Cl.
*G06F 21/78* (2013.01)
*G06F 21/60* (2013.01)
*G06F 21/62* (2013.01)
*G06N 20/00* (2019.01)

(52) U.S. Cl.
CPC ............ *G06F 21/78* (2013.01); *G06F 21/602* (2013.01); *G06F 21/6209* (2013.01); *G06N 20/00* (2019.01)

(58) Field of Classification Search
CPC .... G06F 21/78; G06F 21/602; G06F 21/6209; G06N 20/00
See application file for complete search history.

(56) References Cited

U.S. PATENT DOCUMENTS

| | | | |
|---|---|---|---|
| 10,015,173 B1* | 7/2018 | Efstathopoulos | ... H04L 63/0442 |
| 10,061,717 B1* | 8/2018 | Yang | .......................... H04L 9/14 |
| 10,579,597 B1* | 3/2020 | Anand | .................. G06F 16/289 |
| 10,628,073 B1* | 4/2020 | Zhao | ..................... G06F 3/0608 |
| 2011/0289324 A1* | 11/2011 | Yellepeddy | ............. H04L 9/088 |
| | | | 713/189 |
| 2014/0122867 A1* | 5/2014 | Shrinivasan | ............ H04L 63/08 |
| | | | 713/150 |
| 2014/0230077 A1* | 8/2014 | Muff | ................... G06F 9/45558 |
| | | | 726/30 |
| 2015/0244804 A1* | 8/2015 | Warfield | ................. H04L 49/90 |
| | | | 709/219 |
| 2016/0239685 A1* | 8/2016 | Li | ....................... G11C 14/0036 |
| 2016/0371190 A1* | 12/2016 | Romanovskiy | ........ G06F 3/0659 |
| 2017/0235950 A1* | 8/2017 | Gopalapura Venkatesh | ................ |
| | | | G06F 11/1464 |
| | | | 726/24 |
| 2017/0364529 A1* | 12/2017 | Fagiano | .............. G06F 16/1744 |
| 2019/0392166 A1* | 12/2019 | Awad | ................. G06F 21/6281 |
| 2020/0218813 A1* | 7/2020 | Gedliczka | ........... G06F 21/6218 |
| 2020/0366459 A1* | 11/2020 | Nandakumar | .......... H04L 9/008 |
| 2021/0149819 A1* | 5/2021 | Kotra | .................. G06F 12/1027 |
| 2021/0263779 A1* | 8/2021 | Haghighat | ............ G06F 9/5061 |
| 2021/0374564 A1* | 12/2021 | Kaspa | ................ G06F 9/45558 |

* cited by examiner

*Primary Examiner* — Shin-Hon (Eric) Chen
*Assistant Examiner* — Thomas A Carnes
(74) *Attorney, Agent, or Firm* — Krishnendu Gupta; Nikhil Patel

(57) ABSTRACT

An aspect of the present disclosure relates to one or more data decryption techniques. In embodiments, an input/output operation (IO) stream including one or more encrypted IOs is received by a storage array. Each encrypted IO is assigned an encryption classification. Further, each encrypted IO is processed based on its assigned encryption classification.

8 Claims, 4 Drawing Sheets

STORAGE ARRAY DATA DECRYPTION

BACKGROUND

Computing devices often transmit confidential information over a network (e.g., the Internet). Bad actors, such as hackers, often attempt to intercept confidential information transmitted over a network. Accordingly, computing devices often use one or more data encryption and decryption techniques that cause transmitted information to be useless to anyone that may intercept the information. For example, data encryption techniques include a process that transforms original information into an unrecognizable form. The unrecognizable form is generally entirely different from the original information making it unreadable to hackers. Encryption techniques can include key algorithms that enable users with a correct key (i.e., decoder) to read the encrypted data. Data decryption techniques include a process of converting encoded/encrypted data to its original readable form. The process can include un-encrypting the encoded data using one or more keys used to encrypt the original data.

SUMMARY

An aspect of the present disclosure relates to one or more data decryption techniques. In embodiments, an input/output operation (IO) stream including one or more encrypted IOs is received by a storage array. Each encrypted IO is assigned an encryption classification. Further, each encrypted IO is processed based on its assigned encryption classification.

In embodiments, the classification can define an encrypted IO's related data track as a hot data track or a cold data track.

In embodiments, each hot data track can define a data track's address space having a frequency of address calls above a first threshold. Additionally, each cold data track can define a data track's address spacing having a frequency of address calls below a second threshold.

In embodiments, the first threshold can have a value that is either greater than or equivalent to the second threshold's value.

In embodiments, each IO stream received by the storage array can be monitored. Further, one or more patterns related to one or more of the received encrypted IOs can be identified.

In embodiments, one or more encrypted IOs can be classified based on one or more of the identified patterns.

In embodiments, one or more of the patterns can be identified using a machine learning (ML) processor. The ML processor can be configured to perform a time-series pattern recognition technique on one or more encrypted IOs. One or more encrypted IO models can be generated based on one or more of the identified patterns.

In embodiments, whether one or more of the encrypted IO models includes a classification for a subject encrypted IO can be determined. If one of the encrypted IO models classifies the subject encrypted IO related to a hot data track, the encrypted IO and its related encrypted data to at least the storage array's cache memory or storage device can be directly de-staged. Further, suppose one of the encrypted IO models classifies the subject encrypted IO related to a cold data track. In that case, a data decryption technique can be performed on the encrypted IO and its related data.

In embodiments, the subject encrypted IO can be assigned a default classification if none of the encrypted IO models includes a classification for the subject encrypted IO. Additionally, the data decryption technique can be performed on the subject encrypted IO and its related data if the subject encrypted IO is provided with the default classification.

In embodiments, the data decryption technique can be performed on the subject encrypted IO in response to identifying a hot data track becoming a cold data track.

BRIEF DESCRIPTION OF THE DRAWINGS

The preceding and other objects, features, and advantages will be apparent from the following more particular description of the embodiments, as illustrated in the accompanying drawings. Like reference characters refer to the same parts throughout the different views. The drawings are not necessarily to scale, emphasis instead being placed upon illustrating the embodiments' principles.

DETAILED DESCRIPTION

Organizations often use at least one storage array to store information. A storage array is a data storage system for block-based storage, file-based storage, or object storage. Rather than store data on a server, storage arrays use multiple drives in a collection capable of storing a vast amount of data, managed by a central management system. Accordingly, corporate user devices (e.g., hosts 114*a-n* of FIG. 1) such as laptops, computers, and mobile devices can issue read/write data requests to a storage array. The storage array can reside at a remote location from the user devices. As such, the user devices must send the read/write requests over a communications network.

Unfortunately, many bad actors such as hackers often attempt to intercept the data while being transmitted over the network or access data stored on the array. Organizations often use data encryption and decryption techniques that make the data unusable to those bad actors. Specifically, data encryption is the process of encoding information. The process converts the original information into an alternative form (e.g., encrypted). The encrypted form is incomprehensible to anyone without an appropriate key to decrypt the encrypted information. For example, organizations can provide their user devices and storage arrays with decryption keys, including instructions to decode the encrypted message.

A storage array can identify if the request and/or request's related data is encrypted. Current naïve storage array decryption techniques decrypt every encrypted IO request. However, the storage array must dedicate significant resources (e.g., hardware and/or software resources) to perform data decryption operations. The present disclosure relates to one or more embodiments that perform data decryption operations based on each encrypted IO request's encryption classification.

Figure 1:
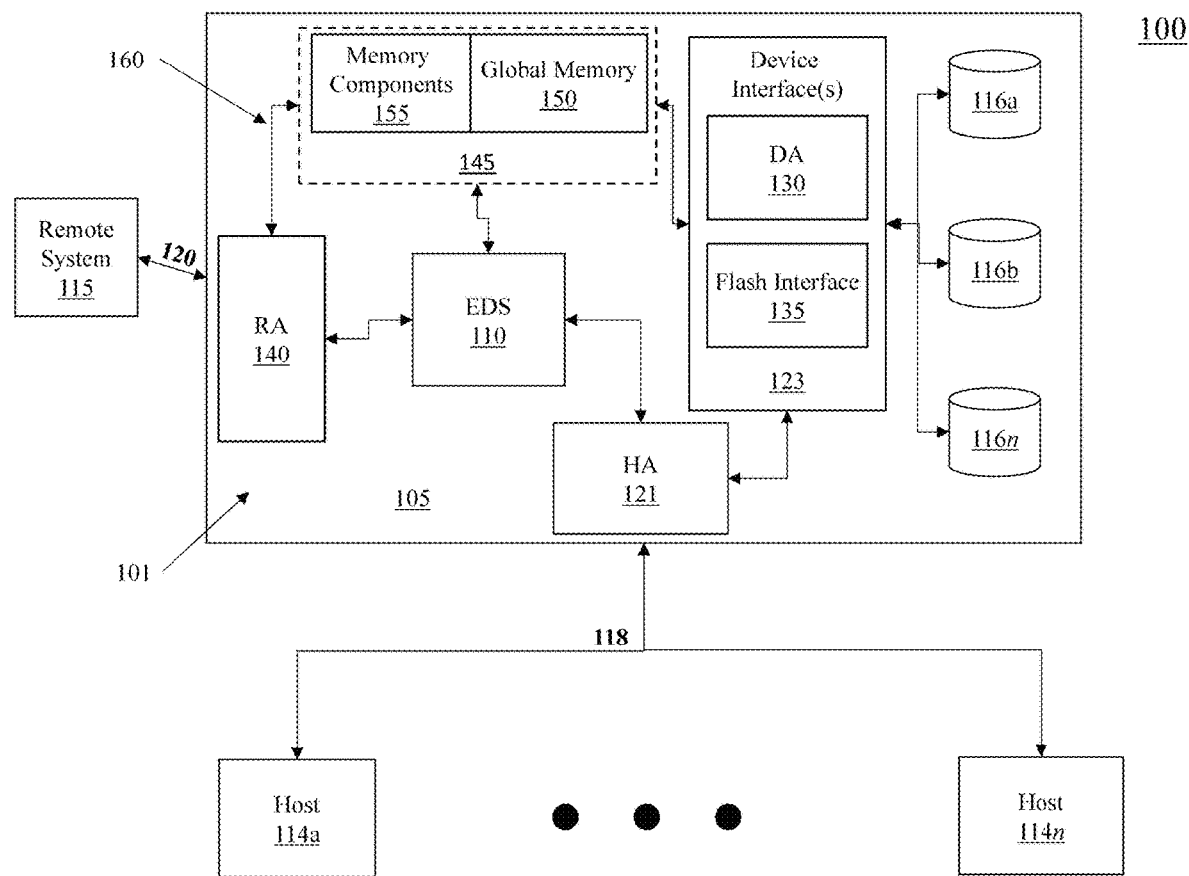
FIG. 1 is a block diagram of a storage array in accordance with embodiments of the present disclosure.

Referring to FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, and/or communication modules. For example, the array's global memory 150 can use the communication channels 160 to transfer data and/or send other communications between the array's components 101.

In embodiments, the array 105 and one or more devices can form a network. For example, a first communication network 118 can communicatively couple the array 105 to one or more host systems 114*a-n*. Likewise, a second communication network 120 can communicatively couple the array 105 to a remote system 115. The first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114*a-n* and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115*a-n*, and the like can connect to the first and/or second networks 118, 120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114*a-n*. The hosts 114*a-n* and the array 105 can be physically co-located or located remotely from one another. In embodiments, an IO request can include a read/write request. For example, an application executing on one of the hosts 114*a-n* can perform a read or write operation resulting in one or more data requests to the array 105. The IO workload can correspond to IO requests received by the array 105 over a time interval.

In embodiments, the array 105 and remote system 115 can include any one of a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. The memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114*a-n*). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116*a-n*. For example, the data storage interface 123 can include a device adapter (DA) 130 (e.g., storage device controller), flash drive interface 135, and the like that controls access to the storage devices 116*a-n*. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116*a-n* can include one or more data storage types, each having distinct performance capabilities. For example, the storage devices 116*a-n* can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile and/or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM and the like. Like the array's storage devices 116*a-n*, the array's memory 145 can have different storage performance capabilities.

In embodiments, a service level agreement (SLA) can define at least one Service Level Objective (SLO) the hosts 114*a-n* expect the array 105 to achieve. For example, the hosts 115*a-n* can include host-operated applications. The host-operated applications can generate data for the array 105 to store and/or read data the array 105 stores. The hosts 114*a-n* can assign different levels of business importance to data types they generate or read. As such, each SLO can define a service level (SL) for each data type the hosts 114*a-n* write to and/or read from the array 105. Further, each SL can define the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114*a-n* with logical representations of the array's physical storage devices 116*a-n* and memory 145 rather than giving their respective physical address spaces. For example, the EDS 110 can establish at least one logical unit number (LUN) representing a slice or portion of a configured set of disks (e.g., storage devices 116*a-n*). The array 105 can present one or more LUNs to the hosts 114*a-n*. For example, each LUN can relate to at least one physical address space of storage. Further, the array 105 can mount (e.g., group) one or more LUNs to define at least one logical storage device (e.g., logical volume (LV)).

In further embodiments, the HA 121 can receive an IO request that identifies one or more of the array's storage tracks. Accordingly, the HA 121 can parse that information from the IO request to route the request's related data to its target storage track. In other examples, the array 105 may not have previously associated a storage track to the IO request's related data. The array's DA 130 can assign at least one storage track to service the IO request's related data in such circumstances. In embodiments, the DA 130 can assign each storage track with a unique track identifier (TID). Accordingly, each TID can correspond to one or more physical storage address spaces of the array's storage devices 116a-n and/or global memory 145. The HA 121 can store a searchable data structure that identifies the relationships between each LUN, LV, TID, and/or physical address space. For example, a LUN can correspond to a physical address space, while an LV can correspond to one or more LUNs. Thus, a group of LUNs can correspond to an entire storage track (e.g., TID).

In embodiments, the array's RA 140 can manage communications between the array 105 and an external storage system (e.g., remote system 115) over, e.g., a second communication medium 120 using a communications protocol. In embodiments, the first medium 118 and/or second medium 120 can be an Explicit Congestion Notification (ECN) Enabled Ethernet network.

In embodiments, the array's EDS 110 can further perform one or more self-optimizing techniques (e.g., one or more machine learning techniques) to deliver performance, availability, and data integrity services for the array 105 and its components 101. Further, the EDS 110 can perform one or more data decryption operations based on each IO request's encryption classification.

Figure 2:
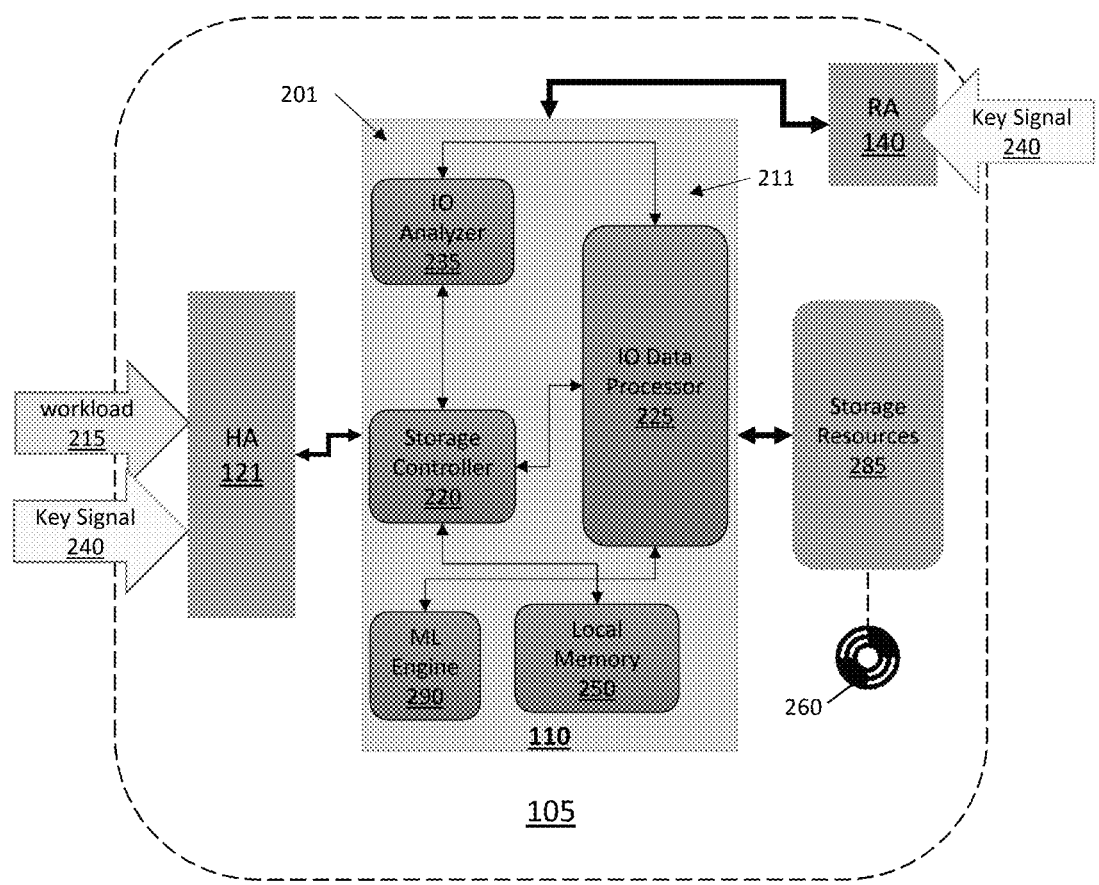
FIG. 2 is a block diagram of an Enginuity Data Services (EDS) processor in accordance with embodiments of the present disclosure.

Regarding FIG. 2, the array's HA 121 can receive an IO workload 215 from at least one of the hosts 114a-n. The IO workload 215 can include one or more IO requests, each having a read/write operation. In embodiments, the IO's request can include data for the array 105 to store to or read from its storage resources 285 (e.g., global memory 150 and/or devices 116a-n of FIG. 1). For example, each IO request can include a virtual storage identifier (e.g., LUN) representing one or more portions of the array's storage resources 285 (e.g., address spaces or data tracks (e.g., TIDs)). In embodiments, EDS 110 can manage IO request processing, as described in greater detail below.

In embodiments, the EDS 110 can include one or more elements 201 configured to perform at least one data encryption/decryption operation. The elements 201 can reside in one or more of the array's other components 101. Further, the EDS 110 and its elements 201 (e.g., software and hardware elements) can be any type of commercially available processor, such as an Intel-based processor and the like. Additionally, the EDS 110 can include one or more internal communication channels 211 that communicatively couple each of the elements 201. The communication channels 211 can include Fibre channels, internal busses, and/or communication modules.

Occasionally, the array 105 can receive encrypted IO requests or requests with encrypted data. Accordingly, the array 105 can receive a decryption key signal 240 from a remote system 115 and/or one or more of the hosts 114a-n to decrypt the request or its corresponding data. The EDS 110 can determine whether it should decrypt each of the workload's IO requests and related data using one or more IO request classification policies, as described in greater detail below.

In embodiments, the EDS 100 can include an IO analyzer 235 that analyzes the workload 215 (e.g., current workload) and/or historical workloads received by the HA 121. The analysis can include determining one or more characteristics of each of the workload's IO requests. For example, each IO request can include metadata including information associated with an IO type, data track related to the data involved with each IO, time, performance metrics, and the like. Based on historical and/or current IO characteristic data, the analyzer 235 can identify one or more IO workload patterns and their corresponding IO request patterns. Further, the IO analyzer 235 can determine the array's storage resources' activity levels related to each of the historical workloads, current IO workload 215, and their respective IO request patterns. The storage resources 285 can include one or more portions of the array's storage devices 116a-n and global memory 150 of FIG. 1. The IO analyzer 235 can generate one or more IO workload models from the identified patterns. Each workload model can include predictions related to future IO workloads, each future workload's IO patterns, and storage resource's activity levels. Further, each workload can include policies and instructions for classifying and processing future IO requests.

In embodiments, the IO analyzer 235 can extract each IO request's metadata to identify each request's characteristics. The IO analyzer 235 can generate a searchable IO request data structure with a schema that facilitates machine learning (ML) processing. For example, the analyzer 235 can select an ML technique based on each of the request's distinct metadata types. Based on the selected ML technique, the analyzer 235 can establish a data schema for the IO characteristics data structure and store the data structure in the EDS processor's local memory 250. Using the ML engine 290, the IO analyzer 235 can determine patterns corresponding to the historical workloads, current workload 215, each workload's IO requests, and the storage resources' activity levels.

In embodiments, the EDS 110 can include an ML engine 290 that can perform one or more self-learning techniques. The ML engine 290 can include hardware and/or logic forming a recursive neural network that identifies any patterns of each IO characteristics data structure's records. An example pattern can correspond to patterns of each workload's and IO request's identified LUNs. The ML engine 290 can further determine each LUN's related physical address space using an address space lookup table stored in, e.g., the local memory 250 or array's memory 145. As such, the ML engine 290 can generate patterns corresponding to each portion of the array's storage resources 285.

In embodiments, EDS 110 can include a storage controller 220 that dynamically monitors the array's storage resources 285. For example, the storage controller 220 can maintain an activity log of events for one or more portions of the resources 280. Each of the storage resources' portions can have a corresponding address space ID that defines their respective locations in the array's global memory 150 or storage devices 116a-n. The events can include real-time (i.e., current) and historical read/write activity. For example, the array 105 can include daemons 260 that communicatively couple to the array's storage resources 285, e.g., via a Fibre channel 160 of FIG. 1. The daemons 260 can record their corresponding storage resources' read/write activity in their respective activity logs. Each record can include information defining each of the read/write's characteristics. The read/write characteristics can include address spaces, read/write data type, data size, storage/memory slot size, read/write performance, SL requirement, and telemetry data, amongst other event-related metadata. The read/write performance can correspond to the array's response time to service the read/write data request and compare the request's related SL requirement and the array's achieved performance (e.g., response time).

In embodiments, storage controller 220 can generate one or more storage resource snapshots by periodically retrieving each daemon's activity log. The storage controller 220 can store the snapshots and activity logs in the local memory 250. In other embodiments, the daemons 260 can randomly or periodically issue activity log reports to the storage controller 220. For example, the storage controller 220 can generate a daemon reporting schedule that defines the duration, start time, and/or end time of each daemon's event collection period. The storage controller 220 can establish the reporting schedules based on patterns of the historical/current workloads, each workload's IO requests, and storage resources' activity levels.

Further, the storage controller 220 can generate a storage resources heatmap from each storage resources snapshot. Each heatmap defines each storage resource portion's read/write activity levels for the current workload 215. Additionally, the storage resource controller 220 can identify heatmap patterns using the ML engine 290. The storage resource controller 220 can generate one or more IO request classification policies using the heatmaps and heatmap patterns.

For example, the resource controller 220 can identify the storage resource portions having the highest and lowest activity levels defined by each heatmap. Accordingly, the resource controller 220 can further determine each heatmap's activity level range. The controller 220 can further define a storage activity level condition for each heatmap based on each heatmap's activity level range and heatmap patterns' ranges. For example, each storage activity level condition can define a storage activity level threshold that a request's corresponding storage resource portion's (e.g., address space's) activity level must exceed. Further, the resource controller 220 can group similar heatmaps. For example, the controller 220 can group heatmaps based on similarities between their respective storage resource activity levels or activity level threshold. The storage controller 220 can generate each IO request classification policy from each heatmap group. For example, a policy classifies a storage resource portion as 'hot' if its activity level exceeds the policy's activity level threshold. If a storage resource portion does not satisfy the policy's activity level condition, it classifies the resource portion as 'cold.'

In embodiments, the IO analyzer 235 can classify an IO request using one of the IO request classification policies. For example, the IO analyzer 235 can select one of the policies based on a relationship between a most recent heatmap generated from the current IO workload's 215 IO requests and each policy's corresponding heatmap group.

In embodiments, the EDS 110 can include an IO data processor 225 configured to process IO requests. The IO data processor 225 can perform one or more data decryption techniques based on each IO request's classification set by the IO analyzer 235. For example, the IO data processor 225 can de-stage each IO request having a 'hot' classification directly to the array's global memory 150 or storage devices 116a-n. For IO requests having a 'cold' classification, the IO data processor 225 can decrypt the IO request and its related data. Upon completing the decryption, the IO processor 225 can perform one or more data storage service operations, including reading/writing the decrypted data from one of the array's storage resources 285.

Figure 3:
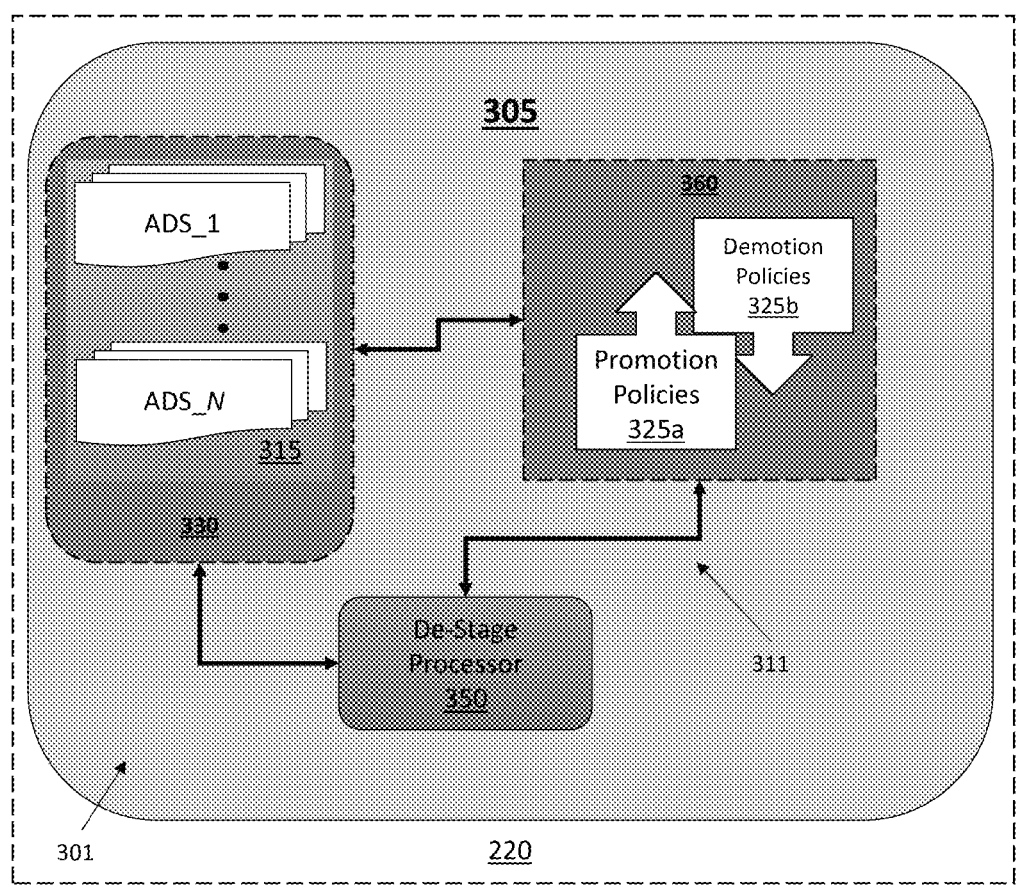
FIG. 3 is a block diagram of a resource controller in accordance with embodiments of the present disclosure.

Regarding FIG. 3, the storage controller 220 can include one or more elements 301 that can de-stage one or more of the array's storage resources 285. The elements 301 can reside in one or more of the array's other components 101. Further, the controller 220 and its elements 301 (e.g., software and hardware elements) can be any type of commercially available processor, such as an Intel-based processor and the like. Additionally, the controller 220 can include one or more internal communication channels 311 that communicatively couple each of the elements 301. The communication channels 311 can include Fibre channels, internal busses, and/or communication modules.

In embodiments, the storage controller 220 can include a memory manager 305 that monitors the array's storage resources 285 (e.g., address spaces). The manager 305 can include an activity tracker 315 that can identify activity level changes requiring address space reclassification based on one or more of the IO request classification policies. For instance, the activity tracker 315 can include counters ADS_1-N can identify a duration each of the address space's activity levels requires a reclassification. For example, the tracker 315 can increment each counter ADS_1-N at the start or the end of a daemon reporting period if its related address space's activity level indicates a change requiring reclassification.

In embodiments, the storage controller 220 can include a de-stage processor 350 that de-stages an address space in response to its assigned counter exceeding a threshold count. For instance, the threshold count can have a value associated with a statistically relevant sample size of the daemon reporting periods. Specifically, each address space having an activity level change indicating a potential need for de-staging that can be fleeting (e.g., an outlier). Thus, the statistically relevant sample size must be large enough to provide statistical confidence and an error margin to perform a de-stage operation. In other words, the sample size provides enough confidence that the activity level will not return to a level that does not require reclassification.

For each address space requiring reclassification, the de-stage processor 350 performs a de-stage operation based on a de-stage policy it received from the controller's de-stage manager 360. The de-stage manager 360 can include one or more promotion and demotion policies 325a-b. For example, the de-stage manager 360 returns a promotion policy 325a to the processor 350 if an address space currently has a 'cold' classification. Conversely, the de-stage manager 360 returns a demotion policy 325b if an address space currently has a 'hot' classification.

In embodiments, at least one of the promotion policies 325a can include instructions to migrate the data from a storage device address space to a global memory address space. Additionally, the policy 325b can include instructions to update a virtual address-to-physical address lookup table based on the migration. Further, the policy 325b can include instructions to classify the new address space and corresponding virtual address as 'hot.'

In embodiments, at least one of the demotion policies 325b can include instructions to decrypt and migrate the data from a global memory address space to a storage device address space. Additionally, the policy 325b can include instructions to update a virtual address-to-physical address lookup table based on the migration. Further, the policy 325b can include instructions to classify the new address space and corresponding virtual address as 'cold.'

The following text includes details of one or more methods and/or flow diagrams in accordance with this disclosure. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter.

Figure 4:
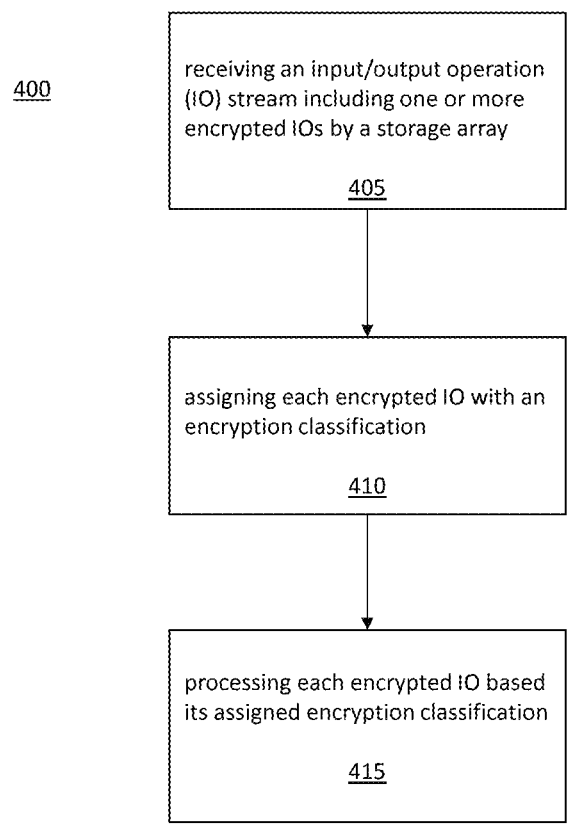
FIG. 4 is a flow diagram of a method for processing for decrypting input/output (IO) related data in accordance with embodiments of the present disclosure.

Regarding FIG. 4, a method 400 can be executed by, e.g., an array's EDS processor and/or any of the array's other components (e.g., the EDS processor 110 and/or components 101 of FIG. 1). The method 400 describes steps for data encryption and decryption. At 405, the method 400 can include receiving an input/output operation (IO) stream, including one or more encrypted IOs by a storage array. The method 400, at 410, can also include assigning each encrypted IO with an encryption classification. At 415, the method 400 can further include processing each encrypted IO based on its assigned encryption classification. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, and/or software. The implementation can be as a computer program product. The implementation can, for example, be in a machine-readable storage device for execution by, or to control the operation of, data processing apparatus. The implementation can, for example, be a programmable processor, a computer, and/or multiple computers.

A computer program can be in any programming language, including compiled and/or interpreted languages. The computer program can have any deployed form, including a stand-alone program or as a subroutine, element, and/or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors and any one or more processors of any digital computer. Generally, a processor receives instructions and data from a read-only memory or a random-access memory or both. For example, a computer's essential elements are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

A computer having a display device that enables user interaction can implement the above-described techniques. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, and/or tactile input.

A distributed computing system that includes a back-end component can also implement the above-described techniques. The back-end component can, for example, be a data server, a middleware component, and/or an application server. Further, a distributing computing system that includes a front-end component can implement the above-described techniques. The front-end component can, for example, be a client computer having a graphical user interface, a Web browser through which a user can interact with an example implementation, and/or other graphical user interfaces for a transmitting device. The system's components can interconnect using any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), and/or other packet-based networks. Circuit-based networks can include, for example, a public switched telephone network (PSTN), a private branch exchange (PBX), a wireless network, and/or other circuit-based networks. Wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), and/or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, and/or, or plural forms of each are open-ended, contain the listed parts and additional unlisted elements. And/or is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. Scope of the concepts is thus indicated by the appended claims rather than by the preceding description. Therefore, all changes embrace the meaning and range of equivalency of the claims.

What is claimed is:

1. A method comprising:
receiving an input/output operation (IO) stream including one or more encrypted IOs by a storage array;
monitoring each IO stream received by the storage array;
identifying one or more patterns related to one or more of the one or more encrypted IOs;
identifying the one or more of the patterns using a machine learning (ML) engine, wherein the ML engine is configured to perform a time-series pattern recognition technique on one or more of the one or more encrypted IOs;
generating one or more encrypted IO models based on one or more of the identified patterns;
assigning each encrypted IO with an encryption classification based on a predefined set of encryption levels correlating to data sensitivity and access frequency;
classifying one or more of the encrypted IOs based on one or more of the identified patterns; and
processing each encrypted IO based on its assigned encryption classification, wherein processing each encrypted IO includes:
determining whether to reclassify a subject encrypted IO based on an activity level of its target address space and a predefined activity threshold specific to the encryption classification,
comparing a service level (SL) response time requirement of the subject encrypted IO with a response time of the storage array, wherein the SL is adjusted based on the encryption classification,
determining whether one or more of the encrypted IO models includes a classification for the subject encrypted IO,
directly de-staging the encrypted IO and its related encrypted data to at least the storage array's cache memory or storage device when one of the encrypted IO models classifies the subject encrypted IO as being related to a hot data track,
assigning the subject encrypted IO with a default classification when none of the encrypted IO models includes a classification for the subject encrypted IO,
performing a data decryption technique on the subject encrypted IO when the subject encrypted IO is provided with the default classification,
performing the data decryption technique on the encrypted IO when one of the encrypted IO models classifies the subject encrypted IO as being related to a cold data track,
in response to identifying at least one hot data track becoming the cold data track, performing the data decryption technique on the subject encrypted IO, and
performing the data decryption technique on the subject encrypted IO when the activity level of its target address space is below the predefined activity threshold.

2. The method of claim 1, wherein the classification defines an encrypted IO's related data track as the hot data track or the cold data track.

3. The method of claim 2, wherein:
each hot data track defines a data track's address space having a frequency of address calls above a first threshold, and
each cold data track defines the data track's address spacing having a frequency of address calls below a second threshold.

4. The method of claim 3, wherein the first threshold has a value that is either greater than or equivalent to the second threshold's value.

5. An apparatus including a memory and a processor configured to:
receive an input/output operation (IO) stream including one or more encrypted IOs by a storage array;
monitor each IO stream received by the storage array;
identify one or more patterns related to one or more of the one or more encrypted IOs;
identify the one or more of the patterns using a machine learning (ML) engine, wherein the ML engine is configured to perform a time-series pattern recognition technique on one or more of the one or more encrypted IOs;
generate one or more encrypted IO models based on one or more of the identified patterns;
assign each encrypted IO with an encryption classification based on a predefined set of encryption levels correlating to data sensitivity and access frequency;
classify one or more of the encrypted IOs based on one or more of the identified patterns; and
process each encrypted IO based on its assigned encryption classification, wherein processing each encrypted IO includes:
determining whether to reclassify a subject encrypted IO based on an activity level of its target address space and a predefined activity threshold specific to the encryption classification,
comparing a service level (SL) response time requirement of the subject encrypted IO with a response time of the storage array, wherein the SL is adjusted based on the encryption classification,
determining whether one or more of the encrypted IO models includes a classification for the subject encrypted IO,
directly de-staging the encrypted IO and its related encrypted data to at least the storage array's cache memory or storage device when one of the encrypted IO models classifies the subject encrypted IO as being related to a hot data track,
assigning the subject encrypted IO with a default classification when none of the encrypted IO models includes a classification for the subject encrypted IO,
performing a data decryption technique on the subject encrypted IO when the subject encrypted IO is provided with the default classification,
performing the data decryption technique on the encrypted IO when one of the encrypted IO models classifies the subject encrypted IO as being related to a cold data track,
in response to identifying at least one hot data track becoming the cold data track, performing the data decryption technique on the subject encrypted IO, and
performing the data decryption technique on the encrypted IO subject encrypted IO when the activity level of its target address space is below the predefined activity threshold.

6. The apparatus of claim 5, wherein the classification defines an encrypted IO's related data track as the hot data track or the cold data track.

7. The apparatus of claim 6, wherein:
- each hot data track defines a data track's address space having a frequency of address calls above a first threshold, and
- each cold data track defines the data track's address spacing having a frequency of address calls below a second threshold.

8. The apparatus of claim 7, wherein the first threshold has a value that is either greater than or equivalent to the second threshold's value.

* * * * *